US011734308B2

(12) United States Patent
Dombroski et al.

(10) Patent No.: US 11,734,308 B2
(45) Date of Patent: Aug. 22, 2023

(54) AUTONOMOUS CACHING FOR VIEWS

(71) Applicant: Oracle International Corporation, Redwood Shores, CA (US)

(72) Inventors: Matthew Dombroski, Lancaster, MA (US); Anne Murphy, Cambridge, MA (US); Ekrem S.C. Soylemez, Lexington, MA (US); James Hartsing, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 559 days.

(21) Appl. No.: 16/824,541

(22) Filed: Mar. 19, 2020

(65) Prior Publication Data
US 2021/0081434 A1 Mar. 18, 2021

Related U.S. Application Data

(60) Provisional application No. 62/899,604, filed on Sep. 12, 2019.

(51) Int. Cl.
*G06F 16/27* (2019.01)
*G06F 16/25* (2019.01)
*G06F 16/28* (2019.01)

(52) U.S. Cl.
CPC .......... *G06F 16/275* (2019.01); *G06F 16/254* (2019.01); *G06F 16/282* (2019.01)

(58) Field of Classification Search
CPC .... G06F 16/275; G06F 16/254; G06F 16/282; G06F 16/24539; G06F 16/27;
(Continued)

(56) References Cited

U.S. PATENT DOCUMENTS 5,897,632 A    4/1999  Dar et al.
5,991,754 A   11/1999  Raitto et al.
(Continued)

OTHER PUBLICATIONS

Hartsing, U.S. Appl. No. 17/027,238, filed Sep. 21, 2020, Notice of Allowance and Fees Due, dated Jun. 6, 2022.
(Continued)

*Primary Examiner* — Alford W Kindred
*Assistant Examiner* — Cecile H Vo
(74) *Attorney, Agent, or Firm* — Hickman Becker Bingham Ledesma LLP

(57) ABSTRACT

Techniques are provided for autonomous caching of hierarchical data. In one technique, query log data is stored that comprises multiple entries, each entry (a) corresponding to a different instance of a query that was executed against a database and (b) indicating a tuple (or level grouping) comprising a set of hierarchy levels corresponding to a set of dimensions. Multiple tuples indicated in the query log data are identified. For each tuple: (1) a set of entries that indicate the tuple is identified and the set of entries is associated with the tuple; (2) aggregated performance data is generated for the tuple based on performance data associated with each entry in the set of entries that is associated with the tuple; and (3) based on the aggregated performance data, it is determined whether to create a new auto-cache table or to delete an existing auto-cache table associated with the tuple.

20 Claims, 5 Drawing Sheets

(58) Field of Classification Search
CPC ...... G06F 16/273; G06F 16/278; G06F 16/25; G06F 16/252; G06F 16/256; G06F 16/258; G06F 16/23
See application file for complete search history.

(56) References Cited

U.S. PATENT DOCUMENTS

| | | | |
|---|---|---|---|
| 6,339,769 B1 | 1/2002 | Cochrane et al. | |
| 6,449,605 B1 | 9/2002 | Witkowski | |
| 6,449,606 B1 | 9/2002 | Witkowski | |
| 6,477,536 B1 | 11/2002 | Pasumansky et al. | |
| 7,546,226 B1 | 6/2009 | Yeh et al. | |
| 7,716,167 B2* | 5/2010 | Colossi | G06F 16/283 707/796 |
| 8,359,325 B1 | 1/2013 | Gui et al. | |
| 9,146,955 B2 | 9/2015 | Nos et al. | |
| 9,519,701 B2 | 12/2016 | Amule et al. | |
| 9,619,581 B2 | 4/2017 | Hughes et al. | |
| 9,740,741 B2* | 8/2017 | Plattner | G06F 16/24539 |
| 10,067,954 B2 | 9/2018 | Kociubes et al. | |
| 10,558,659 B2 | 2/2020 | Hopeman et al. | |
| 2001/0013030 A1 | 8/2001 | Colby et al. | |
| 2010/0235335 A1* | 9/2010 | Heman | G06F 16/2246 707/703 |
| 2010/0325124 A1* | 12/2010 | Wu | G06F 16/2453 707/769 |
| 2013/0198237 A1* | 8/2013 | Serban | G06F 16/24534 707/792 |
| 2013/0238637 A1 | 9/2013 | Gupte et al. | |
| 2014/0244690 A1 | 8/2014 | Vundavalli | |
| 2014/0310232 A1* | 10/2014 | Plattner | G06F 16/24539 707/602 |
| 2015/0242446 A1* | 8/2015 | Stolte | G06F 16/248 707/807 |
| 2016/0063030 A1* | 3/2016 | Chen | G06F 16/24568 707/714 |
| 2018/0182049 A1 | 6/2018 | Oberle | |
| 2018/0341677 A1 | 11/2018 | Fan et al. | |
| 2022/0092069 A1 | 3/2022 | Hartsing et al. | |

OTHER PUBLICATIONS

Hartsing, U.S. Appl. No. 17/027,238, filed Sep. 21, 2020, Final Rejection, dated Apr. 27, 2022.
Rittmanmead, "Metadata Modeling in the Database with Analytic Views", Oracle Database, analytic views, metadata, obiee, DVD, database, analytic view, self-service reporting, Apr. 3, 2017, 15 pages.
Oracle® Database, "Database In-Memory Guide", 12c Release 2 (12.2), dated Jan. 2019, 227 pages.
Oracle® Database, "Database Data Warehousing Guide", 12c Release 2 (12.2), dated Jan. 2018, 699 pages.
Oracle, "Oracle Database In-memory: In-Memory Aggregation", Oracle White Paper, Jan. 2016, 13 pages.
Live SQL, "Creating Analytic Views—Getting Started", dated Jan. 4, 2017, 22 pages.
Fu et al., "CubiST: A New Algorithm for Improving the Performance of Ad-hoc OLAP Queries", dated 2000, 8 pages.
Hartsing, U.S. Appl. No. 17/027,238, filed Sep. 21, 2020, Non-Final Rejection, dated Dec. 22, 2021.

* cited by examiner

AUTONOMOUS CACHING FOR VIEWS

CROSS-REFERENCE TO BENEFIT CLAIM

This application claims the benefit of Provisional Appln. 62/899,604, filed Sep. 12, 2019, the entire contents of which is hereby incorporated by reference as if fully set forth herein, under 35 U.S.C. § 119(e).

TECHNICAL FIELD

The present disclosure relates to caching and, more particularly to, autonomous caching for database objects, such as views.

BACKGROUND

Online Analytical Processing (OLAP) data analysis typically involves hierarchical queries that involve fact data (stored in one or more fact tables) joined with multiple dimension tables that can be flattened or joined to create a hierarchical data representation. A query may reference a view. A view is the result set of a stored query on underlying data, which users can query just as they would in a persistent database collection object. A view, or pre-established query command, is maintained in storage, such as a database dictionary. Unlike ordinary base tables in a relational database, a view does not form part of a physical schema. As a result set, a view is a virtual table computed or collated dynamically from data in the database when access to that view is requested. Changes applied to the data in a relevant underlying table are reflected in the data shown in subsequent invocations of the view.

An example of a view is an analytic view, which provides a fast and efficient way to create queries of data stored in existing database tables and views. Analytic views organize data using a dimensional model and allow for the addition of aggregations and calculations to data sets and presentation of data in views that can be queried with relatively simple SQL. An analytic view is a specific type of object, in the database, that presents a business model of analytic data separate from the physical data model.

A computationally expensive part of these hierarchical queries is aggregating the fact data up multiple (sometimes dozens of) levels across multiple hierarchies. Such aggregations may be part of each OLAP query and vary from query to query by hierarchical level.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system for the autonomous creation and tuning of auto-cache tables that store hierarchical data are provided. A query log of entries corresponding to previously executed queries is analyzed to identify groupings of dimension level values (or "tuples" or "level group"), which are used as the GROUP BY levels for materialized caches. Aggregating these tuples is the most expensive part of a query on a view. A computing component (or "tuner") identifies entries with matching tuples and groups them together. The tuner determines how often various combinations of tuples (or level groups) are queried and a cost (e.g., in time or computing resources) of aggregating those tuples. Then the tuner creates aggregate table caches for the most expensive and frequently used combinations. Additionally or alternatively, the tuner automatically deletes aggregate table caches based on the extent to which such caches improve query performance.

Embodiments improve computer-related technology. For example, embodiments improve response time of hierarchical queries and allow business intelligence (BI) tools to add significant performance improvements without altering their code or data structures.

System Overview

Figure 1:
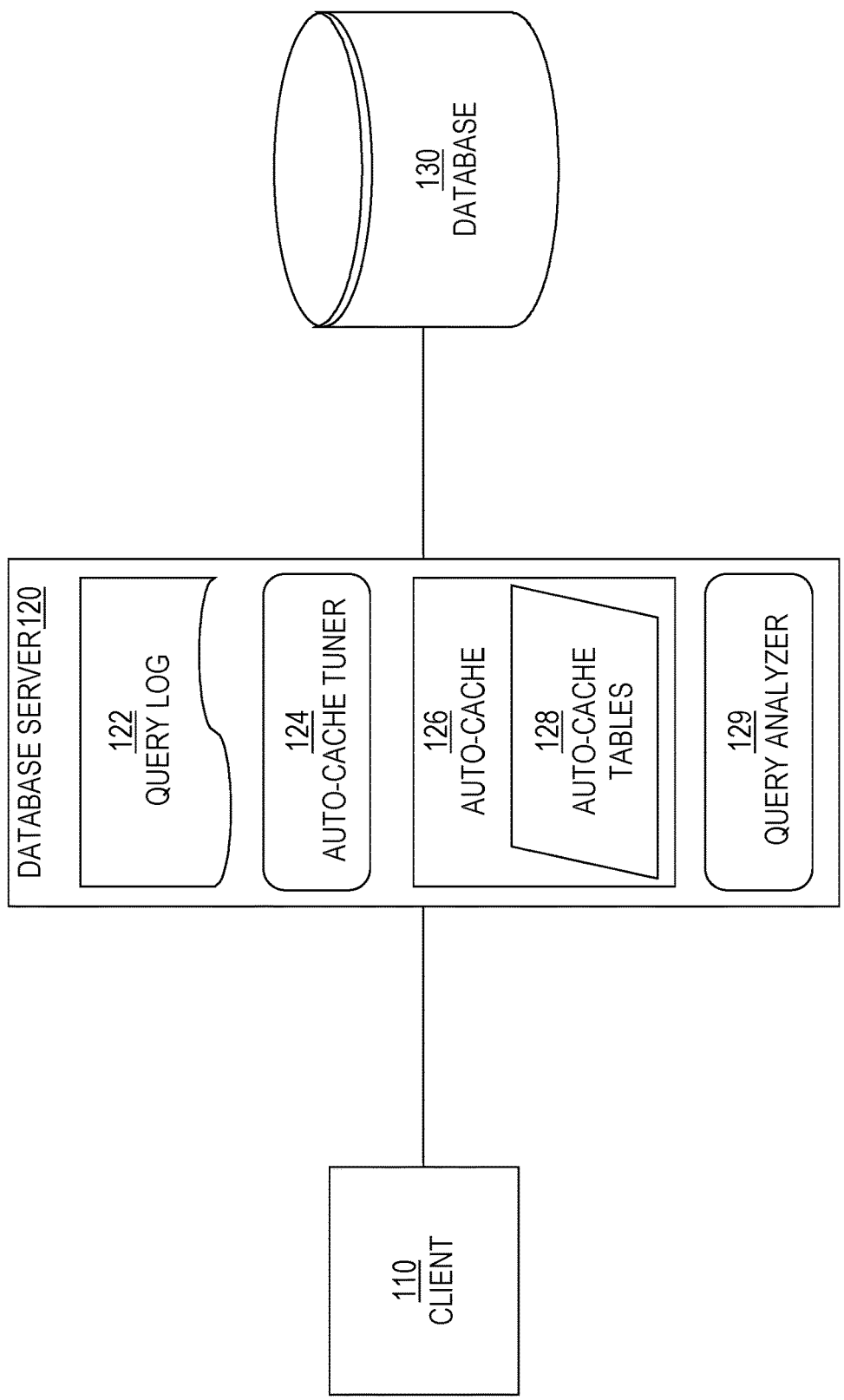
FIG. 1 is a block diagram that depicts an example database system for caching query results, in an embodiment.

FIG. 1 is a block diagram that depicts an example database system 100 for caching query results, in an embodiment. Database system 100 comprises a client 110, a database server 120, and a database 130. Client 110 submits queries to database server 120, which translates the queries into a language or format expected by database 130. An example of client 110 includes a database application that executes on a laptop computer, a desktop computer, a tablet computer, a smartphone, a wearable device, or a computing element executing in a cloud environment. Database 130 comprises one or more base tables. Examples of base tables include fact tables and dimension tables.

Database server 120 accesses database 130 to update base tables and query base tables, sometimes in response to requests from client 110. Examples of updates includes data creation, data deletion, and data modification. Data creation may come in the form of inserting a row or record into a base table. Data deletion may come in the form of deleting a row or record from a base table. Data modification may come in the form of modifying an existing row or record in a base table.

Database server 120 includes a query log archive 122, an auto-cache tuner 124, an auto-cache 126 that includes zero or more auto-cache tables 128, and a query analyzer 129. Query log archive 122 comprises zero or more entries, each corresponding to a different instance of a query that database server 120 received and executed. Thus, multiple entries may correspond to different instances of the same query. As described in more detail herein, each entry also indicates, for each dimension of one or more dimensions indicated in the corresponding query, a level in a hierarchy that corresponds to the dimension. Thus, each entry may comprise multiple levels of different hierarchies.

Auto-cache tuner 124 analyzes query log archive 122 and determines whether to create one or more auto-cache tables and/or delete one or more auto-cache tables. Example criteria for determining whether to create or delete auto-cache tables are described in more detail herein.

Auto-Cache and Views

Auto-cache 126 is "fast" storage media, relative to persistent storage, that is maintained automatically using one or more rules. Examples of such storage media include volatile storage or memory. Auto-cache 126 comprises zero or more data structures containing data, such as tables, referred to herein as auto-cache tables 128. Auto-cache tables 128 may be automatically created, automatically updated or refreshed, and/or automatically deleted. An auto-cache table is defined by a table or an in-memory result cache.

An example of a query that references an analytic view is the following:

SELECT calendar.level_name, calendar.calendar_quarter_dsc, sales
FROM units_hcube HIERARCHIES(time.calendar)
WHERE time.calendar.level_name='QUARTER';

In this example, QUARTER is the only dimension level indicated. Thus, all sales values are aggregated to the QUARTER level. Also, this analytic view query references a particular analytic view (i.e., units_hcube) and one of the analytic view's hierarchies (i.e., time.calendar). This analytic view query is expanded to the expanded query (that considers the underlying data model) that is included in the Appendix. In order to generate the expanded query, a query rewriter has access to one or more schemas. For example, a TIME DIM (or time dimension) table would contain various description columns, one for each language, for example. Also, there may be an attribute dimension defined over the TIME DIM table and hierarchies defined in terms of the attribute dimension. The analytic view would reference those hierarchies. The language descriptions end up as attributes of the analytic view hierarchy levels.

Enabling Auto-Caching and Maintenance

"Enabling" automatic caching refers to allowing auto-cache tables to be automatically created or otherwise maintained. Enabling involves user input to "turn on" auto-caching. "Maintaining" an auto-cache table includes updating or refreshing the auto-cache table and/or deleting the auto-cache table.

In an embodiment, automatic cache maintenance is enabled by default. Thus, no input is required to "turn on" the automatic creation or maintenance of auto-cache tables for any view. Instead, for example, for each view, statistics pertaining to that view are analyzed to determine whether to store the results therefrom in an auto-cache table for that view.

In an embodiment, auto-cache is not enabled by default. Instead, auto-cache is enabled on a per view basis. For example, auto-cache may be enabled for a view using an application programming interface (API) that specifies the name of the view. In a related embodiment, enabling auto-cache for a view results in one or more auto-cache tables being automatically created and associated with the view. The one or more auto-cache tables may be initially empty until the view is executed again. Alternatively, the view is executed immediately (instead of waiting for an instruction from client 110) and results of the view are stored in the one or more auto-cache tables.

In an embodiment, regardless of whether auto-cache is enabled by default, user input may be specified that initiates the creation of an auto-cache table for a particular view. The input may specify the name of the view. Such an auto-cache table is considered "manually" created.

Auto Cache

An auto-cache data is associated with one or more particular views (or analytic views). The cache definitions associated with the auto-cache data are added to view metadata so that the auto-cache data may be used to execute subsequent view queries. Auto-cache data may be stored in a table, in which case the auto-cache data is persistent. Alternatively, auto-cache data may also be dynamically stored in an in-memory data structure, which might not be persistent. (Reference hereinafter to "auto-cache table" covers both persistent and non-persistent versions of auto-cache data.)

An auto-cache table is created by aggregating data from one or more underlying fact tables (and, optionally, one or more dimension tables) used by a view for which the auto-cache table is created. In an embodiment, an initial (or "starter") cache (e.g., 1% of the size of an underlying fact table) may be created when auto cache is enabled. As query execution data is logged and automatically analyzed, auto-cache tables may be created, dropped, and/or refreshed. Each time an auto-cache table is created or dropped, the corresponding cache definition may be added or removed from the view/query metadata.

In an embodiment, if auto-cache is enabled for a view that has enough query history to meet an auto-tune threshold, then, instead of creating the initial starter cache, auto-cache tuner 124 executes that view to create a more targeted cache. Additional auto-caches may be created in addition to an initial starter cache unless a size restriction (described in more detail below) is encountered. A "starter cache" is one that refers to an initial cache that is created. There might not be any 1% limitation, except by default.

When a query for a view is executed, query analyzer 129 assess levels being queried and determines whether one or more auto-cache tables are defined (on the view) that can reduce the aggregation cost. If so, then query analyzer 129 compiles the query to use the auto-cache table(s).

An auto-cache table may store all the measures in a view or a subset of the measures. Whether all measures or a subset are stored in an auto-cache table may be determined by a view query that queries the view. A cache definition for an auto-cache table may specify, for example, "MEASURE GROUP ALL," which indicates that all measures of a view are part of the auto-cache table. Or the cache definition may specify "MEASURE GROUP (sales, units)," which indicates that only the measures "sales" and "units" are part of the corresponding auto-cache table.

Auto-Cache Table Characteristics

An auto-cache table may be created in one or more of the following ways: an auto-cache enable procedure, an auto-tune computer job, or manually through an auto-cache create procedure.

An auto-cache table may be removed or deleted in one or more of the following ways: automatically when the corresponding view is dropped or deleted (described in more detail herein), an auto-cache disable procedure, an auto-tune computer job, or manually through an auto-cache remove procedure.

An auto-cache table may be named in one of multiple ways. For example, an auto-cache table may be automatically named by prepending "Auto_CacheN_X" to the corresponding view name, where "N" is a rolling sequential number and "X" is an object identifier of the corresponding view. Thus, there may be multiple auto-cache tables associated with a single view. For example, multiple auto-cache tables may be generated, each aggregating to a tuple that is used often in querying a view. Each tuple (or level group) comprises the pertinent dimension levels used by the corresponding query. When a view is queried, the system determines whether there is any auto-cache table whose tuple matches (at least partially) the tuple(s) of the query.

An auto-cache table may be created in the same tablespace as a view. Also, an auto-cache may be created with the same owner as the corresponding view.

Example metadata of an auto-cache table includes owner of the auto-cache table, name of the auto-cache table, name of corresponding view, maximum size, refresh interval, refresh state, last refresh timestamp, last tune timestamp, minimum number of queries for tuning, average query time for tuning, last updated timestamp, number of queries when created, total query time before table creation, total query time after table creation, average query time before table creation, average query time after table creation, and last query time. Other types of aggregated statistics other than average that may be stored as metadata associated with an auto-cache table include median query time (before and after table creation), longest query time (before and after table creation), shortest query time (before and after table creation), and different quantiles of query time (before and after table creation).

In an embodiment, an auto-cache table is refreshed automatically. "Refreshing" an auto-cache table may involve an incremental refresh (where only the data that is changed is updated) or may involve a full refresh, where the query that defines the data in the auto-cache table is executed. One factor that may trigger such a refresh is a time interval, such as every ten minutes. Each auto-cache table may be automatically associated with a default refresh interval. Additionally, the refresh interval may be reset manually by, for example, a system administrator, using an auto-cache table enable procedure. The refresh interval may pertain to all auto-cache tables on a view. A refresh interval may have a single value (e.g., seven days). A refresh interval of 0 may disable automatic refresh.

Additionally or alternatively to an auto-refresh of an auto-cache table, an auto-cache table may be refreshed in response to a refresh procedure that is manually invoked or specified.

System Parameters for Auto-Cache Tables

One or more system parameters may be specified that dictate how space (or memory) is managed for auto-cache tables. One example system parameter is a "total size" parameter that indicates a total cache size limit for all views. The total size parameter may be expressed in multiple ways, such as a percentage or a number of bytes (or gigabytes). For example, a percentage value indicates the percentage of space used by all fact tables for all views. An example range of possible percentage values include 1%-100%. A default value may be 10%. A maximum value of 100% means that total size of all auto-cache tables must not exceed the total size of all fact tables for all views. As another example, a gigabyte value indicates an absolute space limit. An example range of possible values includes one gigabyte to ten gigabytes. A default value may be five gigabytes.

Another example system parameter is an auto-cache "table size" that indicates a size limit of any individual auto-cache table. The auto-cache table size parameter may be expressed in multiple ways, such as a percentage or a number of bytes (or gigabytes). For example, a percentage value indicates the percentage of space used by the fact table for the analytic view for which the auto-cache table is being created, as calculated when the new auto-cache table is created. An example range of possible percentage values include 1%-100%. A default value may be 1%. As another example, an absolute space limit is indicated in gigabytes. An example range of possible values includes one gigabyte to no maximum. A default value may be one gigabyte.

Another example system parameter is an auto-cache "view size" that indicates a size limit of all auto-cache tables for a single view. The auto-cache view size parameter may be expressed in multiple ways, such as a percentage or a number of bytes (or gigabytes). For example, a percentage value indicates the percentage of rows in the underlying fact table for the analytic view for which the auto-cache tables are created, as calculated when a new auto-cache table for the view is created. An example range of possible percentage values include 1%-100%. A default value may be 10%. As another example, an absolute space limit is indicated in gigabytes. An example range of possible values includes one gigabyte to no maximum.

Another example system parameter is "maximum caches" that indicates a maximum number of auto-cache tables that may be created for a single view. An example range of possible values include one to ten, where a default value is five.

If any parameter is exceeded when determining whether to create (or store) a new auto-cache table, then one or more actions may be performed. For example, auto-cache tuner 124 identifies the least recently used auto-cache table and deletes it. Auto-cache tuner 124 may continue to delete least recently used auto-cache tables until there is enough space to create the new auto-cache table. As another example, the new auto-cache table is not created or is immediately discarded or deleted, particularly if the new auto-cache table itself would violate the auto-cache "table size" parameter. Additionally, an exception may be raised or logged. Additionally or alternatively, a notification message is transmitted. Examples of notification messages includes an email message that is addressed to a system administrator, a text message that is transmitted over a cellular network to a computing device (e.g., smartphone) of a system administrator, and an update to an electronic dashboard comprising a graphical user interface. The update may be manifested in a number of ways, such as a pop-up message, the appearance of an icon, or a change to an existing icon.

In an embodiment, a "flattened hierarchy cache" (distinguished from auto-cache tables) materializes a complex multi-table inline view that is used for each query involving the hierarchy so that the hierarchy does not have to be compiled and executed for each view query using that hierarchy. The size of a flattened hierarchy cache may or may not contribute to the total size, view size, maximum caches, and table size parameters. Flattened hierarchy caches are less complex than auto-cache tables and require little to no tuning.

Auto-Cache Tuner

Auto-cache tuner 124 automatically creates and/or maintains auto-cache tables based on query log archive 122. Auto-cache tuner 124 may be implemented as a relational database management system (RDBMS) package. Auto-cache tuner 124 analyzes query log archive 122 (or view usage data) pertaining to a particular view in light of one or more thresholds in order to determine optimized auto-cache tables that should be materialized to improve performance of that view's workload. In response to the analysis (as described in more detail below), auto-cache tuner 124 may define and materialize one or more auto-cache tables on the view.

For existing auto-cache tables, auto-cache tuner 124 (or another component of database server 120) may refresh such tables. An auto-cache table may be refreshed incrementally or by querying the entirety of the corresponding view. For example, an auto-cache table is refreshed at certain intervals (e.g., daily) or in response to certain events (e.g., when the auto-cache table contains stale or out-of-date data).

Auto-cache tuner 124 may also delete or remove auto-cache tables that are deemed to no longer be optimal. For example, if a view corresponding to an auto-cache table has not been executed in the last N days, then the auto-cache table is removed. As another example, auto-cache tuner 124 determines that (1) an auto-cache table is not producing good enough results (e.g., a small percentage improvement) and (2) a new auto-cache table may provide (i) better results over a greater tuple range (or combination of dimension levels) of queries (supersedes) or (ii) a larger percentage improvement for a greater number of queries (e.g., a new auto-cache table has a higher total time ranking and/or higher average time). As a result of the determination, the auto-cache table is removed (and the new auto-cache table may be generated). As another example, auto-cache tuner 124 determines that (1) a first auto-cache table is similar to a second auto-cache table, (2) the first auto-cache table is producing similar performance improvements as the second auto-cache table, but (3) the second auto-cache table is smaller than the first auto-cache table. As a result of this determination, the first auto-cache table is removed.

Processing Query Log Archive

Query log archive 122 comprises zero or more entries, each corresponding to a different instance of a query that database server 120 received and executed. Query analyzer 129 may generate each entry in query log archive 122 based on analyzing a view compiler log (not depicted) that contains the original query and/or the expanded version of the query. Each query may rely on zero or more views.

An entry may contain data that identifies an owner and name of the corresponding view(s) and the execution time of the query that corresponds to the entry. Additionally, an entry contains data extracted from its corresponding query and organized in a particular way. For example, an entry contains a tuple, which comprises the pertinent dimension levels used by the corresponding query as determined by query analyzer 129. A set of one or more hierarchy levels corresponding to different dimensions is referred to herein as a "tuple" or "level grouping." Query analyzer 129 identifies one or more dimension levels that are indicated in a query and inserts data that identifies the dimension levels into a corresponding entry. The order of the dimension levels indicated in the entry may be pre-defined or may be based on the order of the dimension levels in the query. When creating an entry, the dimensions may be specified in the corresponding query or may be inferred from the dimension levels. For example, when identifying a dimension level, query analyzer 129 may use a dimension level to look up the corresponding dimension in a mapping of dimension levels to dimensions. Multiple entries in query log archive 122 may correspond to different instances of the same tuple.

Example dimensions include geography and time. Example levels in a hierarchy for the geography dimension include region, country, and customer, where a specific country includes all customers associated with that country and where a specific region includes all customers of all countries associated with that region. Example levels in a hierarchy for the time dimension include year, quarter, month, and day, where a specific month includes all dates in that month, a specific quarter includes all months in that quarter, and a specific year includes all quarters in that year.

Additionally, some dimensions may have multiple hierarchies. For example, the time dimension may have a hierarchy for calendar year and another hierarchy for a fiscal year. Thus, calendar quarters may be distinct from fiscal quarters, and so forth.

Each entry in query log archive 122 indicates one or more hierarchy levels corresponding to different dimensions. In the example analytic view query above, the hierarchy level is QUARTER in the time dimension. Each entry includes a tuple. A tuple may be separately identified and stored as a field in an entry. A tuple may have an order such that a level for one dimension always precedes the level of another dimension, if both dimensions are part of the corresponding query.

Different entries in query log archive 122 may have tuples of different sizes. For example, a first tuple may be [ITEM, YEAR] whereas a second tuple may be [CHANNEL, ITEM, QUARTER]. This means that the query corresponding to the second tuple specified a CHANNEL level of a particular dimension while the query corresponding to the first tuple did not specify any level for that particular dimension. In the case where CHANNEL is not part of the level tuple, the assumption is that CHANNEL is aggregated over all leaves. In other words, the results for that particular dimension are aggregated to the top of the particular dimension.

Additionally, each entry may include a query time that indicates how long it took a database system to process the corresponding query. "Query time" may include (1) the time required to compile the query (e.g., create an execution plan or select an existing execution plan) (referred to as "compile time") and (2) the time to execute the query (or execute the execution plan) (referred to as "execution time"). Alternatively, "query time" may exclude compile time. Alternatively still, the query time for a particular query is the total time for all executions of the particular query cursor, which would include any compilation time taken in one or more executions. Once a cursor is cached, there is no longer compilation time. The total time (which includes the one compilation time and the multiple execution times) may be divided by the number of executions of the particular query to compute an average query time. The total time and/or the average query time may be used.

Processing a Query Log

Query log archive 122 is processed to obtain information about the queries indicated in query log archive 122. Such information is used to determine whether to create an auto-cache table and/or delete an existing auto-cache table.

Figure 2A:
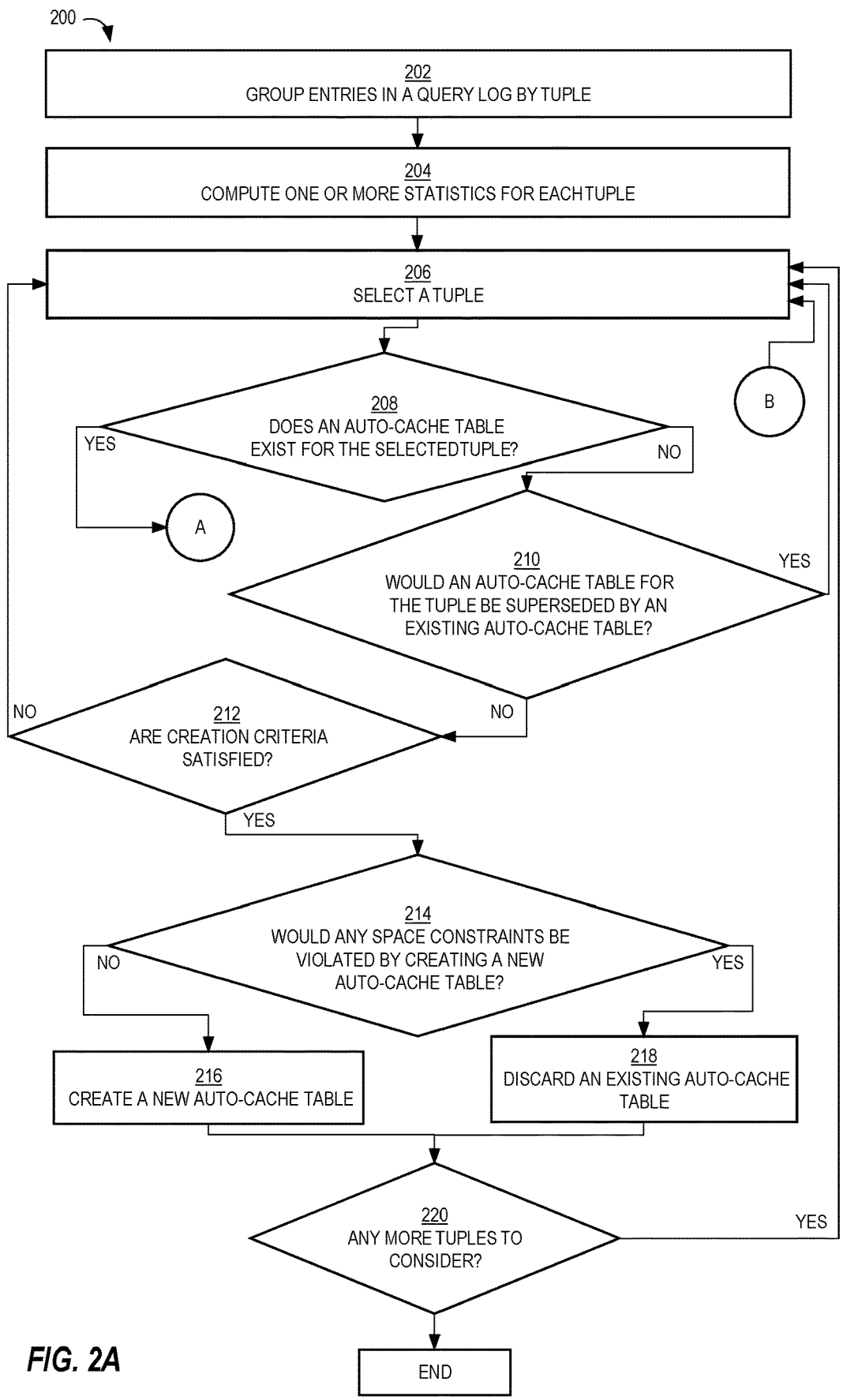
FIG. 2A is a flow diagram that depicts an example process for automatically creating auto-cache tables, in an embodiment.

FIG. 2A is a flow diagram that depicts an example process 200 for processing query log archive 122, in an embodiment. Process 200 may be implemented by auto-cache tuner 124. Process 200 may be initiated by user input, such as input from a system administrator or from an owner of a (e.g., analytic) view. Alternatively, process 200 may be initiated automatically, such as on a regular basis (e.g., every thirty minutes) or in response to the occurrence of one or more types of events, such as a query time for one or more queries exceeding a particular time threshold or available memory to store auto-cache tables crossing a certain threshold.

At block 202, the entries in query log archive 122 are grouped by tuple. For example, each entry that specifies (or at least indicates) [ITEM, YEAR] as the tuple is grouped together, each entry that specifies [ITEM, QUARTER] as a tuple is grouped together (distinct from the first entry grouping), and each entry that specifies [CHANNEL, ITEM, QUARTER] as a tuple is grouped together, distinct from the other entry groupings.

At block 204, for each tuple (or entry grouping), one or more statistics are computed. Example statistics include aggregated performance measures of queries corresponding to a tuple. For example, the query times of each query instance corresponding to a tuple is summed or totaled. Also, the number of entries corresponding to the tuple is counted, which number corresponds to the number of query instances that indicated (or referenced) the corresponding tuple. Based on the total query time and the number of query instances, an average query time may be calculated for the tuple. The tuples may then be ranked by total query time. An example of such an output is the following table:

TABLE A

| TUPLE | TOTAL QUERY TIME | COUNT | AVE. QUERY TIME |
|---|---|---|---|
| ITEM, YEAR | 65 | 20 | 3.25 |
| CHANNEL, ITEM, QUARTER | 54 | 7 | 7.22 |
| WAREHOUSE, QUARTER | 32 | 12 | 2.58 |
| ITEM, QUARTER | 16 | 64 | 0.25 |

At block 206, a tuple is selected. The tuple that is selected during the first instance of block 206 may be the tuple associated with the highest total query time. Thus, given the example of Table A, the first tuple that is selected is [ITEM, YEAR]. A rationale for selecting a tuple on this basis is the tuple with the highest total query time will receive the most benefit from an auto-cache table. Alternatively, tuples may be selected based on average query time and/or count.

Figure 2B:
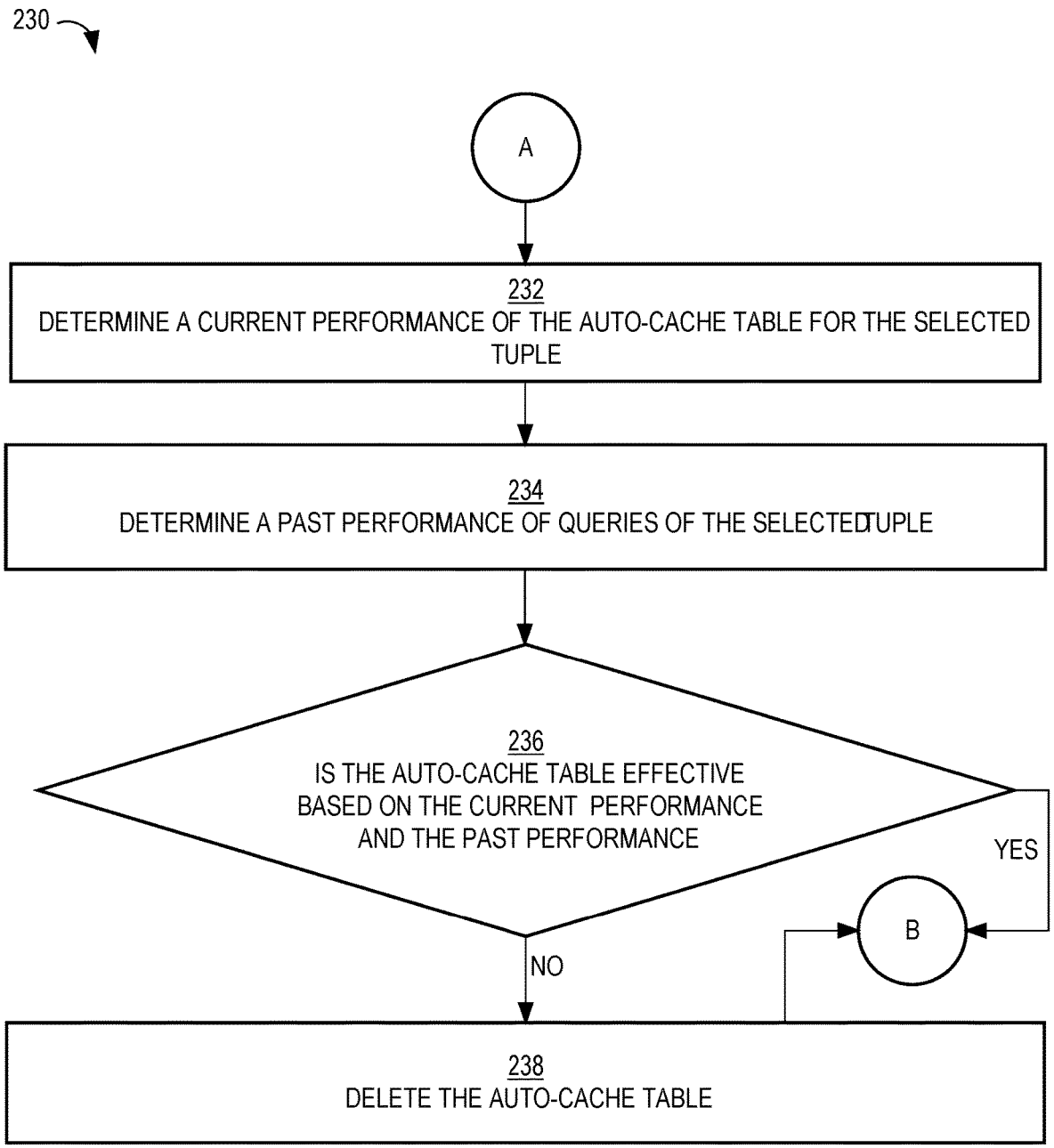
FIG. 2B is a flow diagram that depicts an example process for automatically tuning auto-cache tables, in an embodiment.

At block 208, it is determined whether an auto-cache table exists for the selected tuple. For example, block 208 may involve determining whether the selected tuple exactly matches a tuple associated with an existing auto-cache table. If not, then process 200 proceeds to block 210. Otherwise, process 200 proceeds to block 232 of FIG. 2B.

At block 210, it is determined whether an auto-cache table for the selected tuple would be superseded by an existing auto-cache table. For example, the tuple [ITEM, QUARTER] supersedes the tuple [ITEM, YEAR] since [ITEM, QUARTER] can be used to supply data for [ITEM, YEAR] in an efficient fashion, i.e., by aggregating rows or records corresponding to quarters to generate one or more aggregated year values. Therefore, given tuple [ITEM, YEAR] and an existing auto-cache table based on tuple [ITEM, QUARTER], an auto-cache table for tuple [ITEM, YEAR] might not be created.

In an embodiment, a limit of a certain number of hierarchy levels of a dimension between two tuples may be imposed in order for an existing auto-cache table to supersede a potentially new auto-cache table. For example, if there are more than two levels in a particular dimension hierarchy between tuples, then a new auto-cache table may be created even though the new auto-cache table may be superseded by an existing one; otherwise, a new auto-cache table is not created. As a specific example, if an auto-cache table exists for [ITEM, WAREHOUSE] and the current selected tuple is [ITEM, COUNTRY], because there are more than two levels difference between levels WAREHOUSE and COUNTRY (e.g., SHIP-TO, WAREHOUSE, CITY, COUNTY, STATE, COUNTRY) in the customer hierarchy of the respective tuples, then a new auto-cache table may be created for [ITEM, COUNTRY], even though the auto-cache table for [ITEM, WAREHOUSE] could be used to generate an answer to a view query involving [ITEM, COUNTRY].

Additionally, an auto-cache table associated with multiple specified levels for different dimensions may also supersede an auto-cache table associated with fewer specified levels since the additional levels can be aggregated to "top" or "all" more efficiently than starting from the leaf level. For example, an auto-cache table based on [CHANNEL, ITEM, QUARTER] can supersede an auto-cache table based on [ITEM, QUARTER] because CHANNEL can be aggregated to "top" quicker than from the leaf level.

If the determination in block 210 is positive (i.e., an auto-cache table for the selected tuple would be superseded by an existing auto-cache table), then process 200 returns to block 206 where another tuple is selected. Continuing with the above example and Table A, the second time block 206 is entered, the second tuple that is selected may be [CHANNEL, ITEM, QUARTER], since it is associated with the second highest total query time.

If the determination in block 210 is negative, then process 200 proceeds to block 212.

Determining Whether to Create Auto-Cache Tables

At block 212, it is determined whether one or more creation criteria for the tuple (or entry grouping) are satisfied. Examples of such creation criteria include a minimum number of queries and a minimum query time. Example default values for such creation criteria are ten and three seconds, respectively. (The values of the creation criteria may be manually tuned, such as by an owner of the analytic view or a system administrator.) Thus, in order to generate an auto-cache table for a tuple, at least ten previous queries (or entries) must indicate the tuple and the average query time of those previous queries must be three seconds or greater.

At block 214, it is determined whether one or more space constraints would be violated if the new auto-cache table is created and stored. If not, then the new auto-cache table is created in block 216. Otherwise, either the new auto-cache table is not created or an existing auto-cache table is discarded (in block 218). For example, the least recently used (LRU) auto-cache table (or the one with the oldest "last query date") may be discarded or removed from auto-cache 126.

For example, if a space parameter is maximum number of auto-cache tables and the new auto-cache table would cause the current value of that space parameter to exceed the maximum, then the "oldest" auto-cache table in terms of use is selected for removal. As another example, if a space parameter is a maximum total cache size and the new auto-cache table would cause the current value of that space parameter to exceed that maximum, then the one or more "oldest" auto-cache tables in terms of use are selected for removal.

One or more space constraints may be checked before generating the new auto-cache table or after generating the new auto-cache table. For example, if the current number of auto-cache tables for the corresponding view already equals the value of the maximum caches parameter, then an auto-cache table is not generated in block 212. Performing such a check potentially saves computing resources. However, for some (or all) space constraints, instead of not generating a new auto-cache table, an existing auto-cache table may be deleted to make room for the new auto-cache table.

In an embodiment, a determination is made whether the newly created auto-cache table supersedes another auto-cache table. If so, then the other auto-cache table may be automatically deleted or a determination of the extent to which the newly-created auto-cache table save computing resources if used to answer queries on the other auto-cache table. Alternatively, an effectiveness test of the other auto-cache table may be made, such as comparing a current performance measure of queries leveraging the auto-cache table with a previous performance measure of queries that did not leverage the auto-cache table (e.g., before the other auto-cache table was created). If the current performance measure is not substantially better than the previous performance measure (e.g., at least a 30% reduction in average query time), then the other auto-cache table is automatically deleted.

Block 216 may involve storing metadata about the auto-cache table that was created (if created). One item of metadata allows the auto-cache table to be visible to query analyzer 129 that processes view queries so that query analyzer 129 may leverage the auto-cache table, if applicable. Another item of metadata may include one or more performance statistics of view queries that involved the selected tuple. Example statistics are those found in Table A. Another item of metadata may include a timestamp that indicates when the auto-cache table was created. Such a timestamp may be used to calculate one or more performance statistics for view queries that were processed using the auto-cache table and compare (1) those performance statistics with (2) one or more performance statistics for view queries that were processed before the auto-cache table. Other example metadata for an auto-cache table include owner, name, name of the corresponding view, level group (tuple), number of rows, blacklisted flag, last query timestamp, total number of queries for this tuple when created, and average query time for this tuple when created.

At block 220, it is determined whether there are any more tuples to consider, i.e., that have not already been selected and analyzed. Block 220 may be restricted to only considering tuples that were identified in block 202. Alternatively, during process 200, additional queries may have been received that leveraged one or more of the views corresponding to one or more of the tuples identified in block 202. In that case, the one or more statistics that were computed in block 204 may be updated. If so, then those tuples may be considered again before proceeding to tuples that have not yet been considered. For example, after selecting the first tuple in Table A and determining not to generate an auto-cache table for that tuple, the second tuple in Table A is selected. In the meantime, multiple view queries involving the first tuple are processed and executed, causing statistics (e.g., total query time and average query time) associated with the first tuple to be updated. After selecting the second tuple and proceeding with subsequent blocks in process 200 relative to the second tuple, the first tuple is selected again in a third iteration of block 206.

If the determination in block 220 is positive, then process 200 returns to block 206 where another tuple is selected (or to block 202). Otherwise, process 200 ends.

Evaluating Effectiveness of Current Auto-Cache Tables

FIG. 2A is a flow diagram that depicts an example process 230 for tuning auto-cache 126, in an embodiment. Process 230 may also be implemented by auto-cache tuner 124.

At block 232, a current performance of the auto-cache table for the selected tuple is determined. Performance of an auto-cache table refers to the performance of queries that relied upon the auto-cache table during query execution. Performance may be measured in query time or computing resource(s) used, such as an amount of memory, a number of CPU cycles, and a number of network resources. Block 232 may involve identifying all entries in query log archive 122 associated with the selected tuple where the corresponding queries were executed after the auto-cache table was created and, thus, used the auto-cache table during their respective executions. A total query time and/or an average query time may be computed based on the identified entries.

At block 234, a past performance of queries of the selected tuple is determined. "Past performance" refers to performance of queries that were executed prior to the creation of the auto-cache table of the selected tuple. Such past performance may be stored in metadata associated with the selected tuple. Thus, block 234 may involve reading the appropriate metadata associated with the selected tuple.

At block 236, it is determined whether the auto-cache table is effective based on the current performance (determined in block 232) and the past performance (determined in block 234). "Effectiveness" may be measured by computing a difference between the current performance and the past performance. For example, a current average query time is computed and a past average query time is computed. Effectiveness may be an absolute measure (e.g., ten fewer seconds in query time) or a relative measure (e.g., 50% reduction CPU cycles). If the determination of block 236 is positive, then process 230 returns to block 206. Otherwise, process 230 proceeds to block 238.

At block 238, the auto-cache table is deleted. Alternatively, the auto-cache table is blacklisted to either prevent the auto-cache table from being used in the future or cause the auto-cache table to be a candidate for deletion if a new auto-cache table would be created but for the space (e.g., in memory) occupied by the auto-cache table.

Database Systems

A database management system (DBMS) manages a database. A DBMS may comprise one or more database servers. A database comprises database data and a database dictionary that are stored on a persistent memory mechanism, such as a set of hard disks.

Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology. Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

Changes to a database in a DBMS are made using transaction processing. A database transaction is a set of operations that change database data. In a DBMS, a database transaction is initiated in response to database statement requesting a change, such as DML statement requesting as an update, insert of a row, or a delete of a row. Committing a transaction refers to making the changes for a transaction permanent.

Under transaction processing, all the changes for a transaction are made atomically. When a transaction is committed, either all changes are committed, or the transaction is rolled back. DML statements or commands refer to statements that specify to change data, such as INSERT and UPDATE statement. A DML statement or command does not refer to statement that merely queries database data.

In a distributed transaction, multiple DBMSs commit a distributed transaction using two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMS.

A two-phase commit involves two phases, the prepare-to-commit phase and the commit phase. In the prepare-to-commit phase, branch transaction is prepared in each of the participating database systems. When a branch transaction is prepared on a DBMS, the database is in "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

According to an embodiment, the prepare-to-commit phase includes adding a block to a blockchain, or log record containing a blockchain. Thus, a participating DBMS cannot enter the prepared state or acknowledge such until the block is added.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare, or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A multi-node database management system is made up of interconnected nodes each running a database server that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. workstations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance".

A database server may comprise multiple database instances, some or all of which are running on separate computers, including separate server blades.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table.

Metadata in the database dictionary defining a procedure may specify a name of the procedure, the procedure's arguments, and the return data type and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e. .java file) and the compiled version of the class (i.e. .class file).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
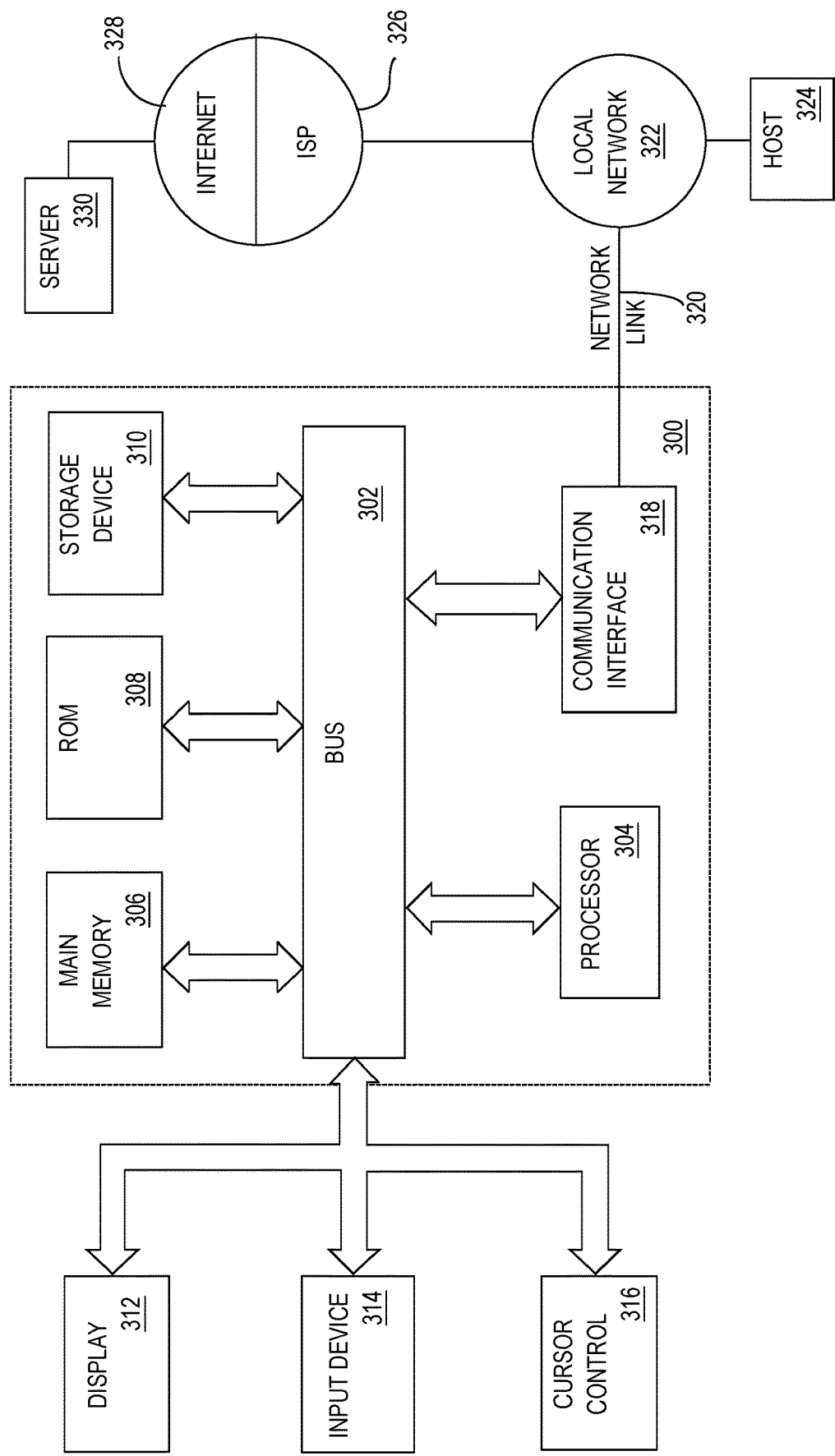
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 4:
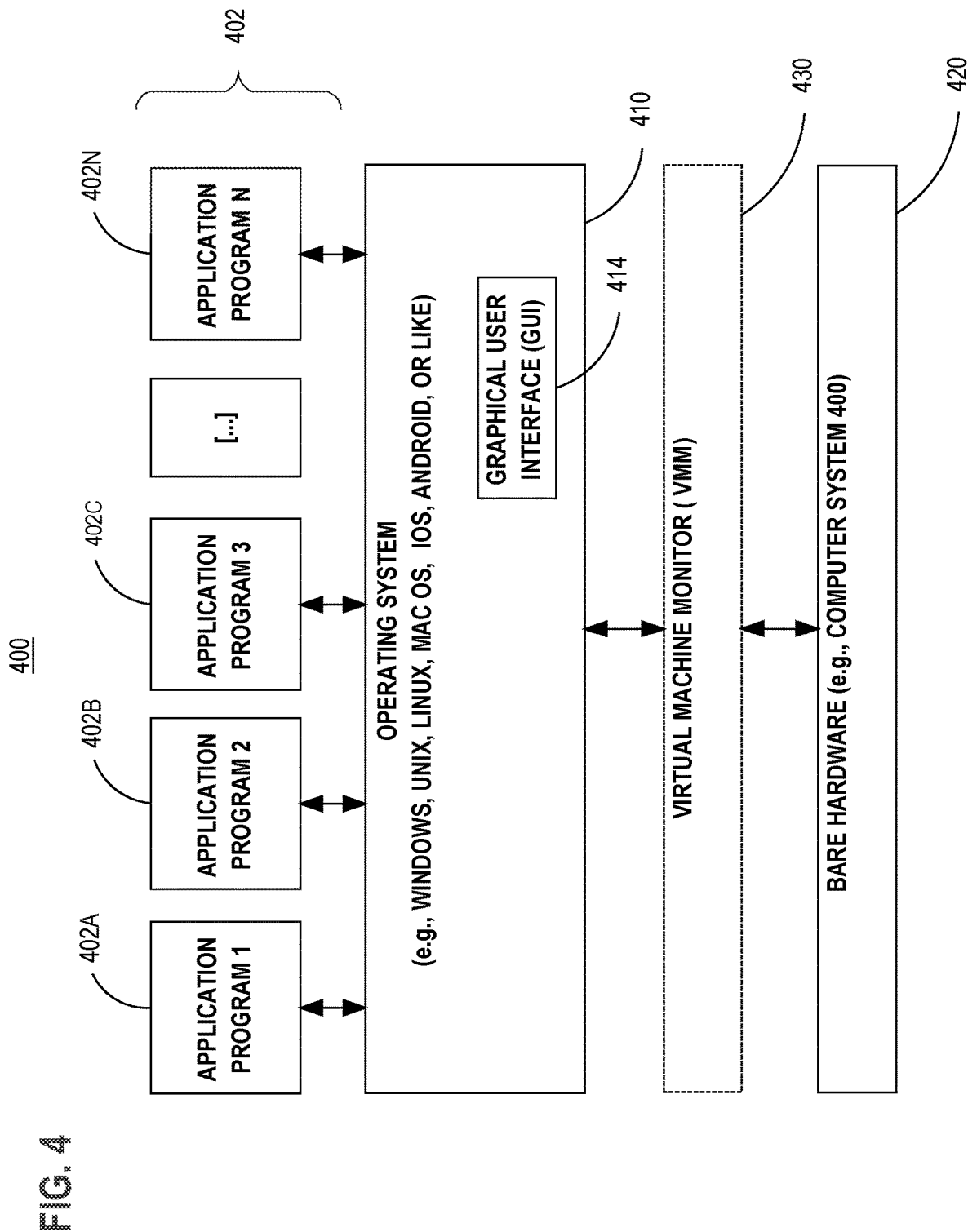
FIG. 4 is a block diagram of a basic software system that may be employed for controlling the operation of the computer system, in an embodiment.

FIG. 4 is a block diagram of a basic software system 400 that may be employed for controlling the operation of computer system 300. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computer system 300. Software system 400, which may be stored in system memory (RAM) 306 and on fixed storage (e.g., hard disk or flash memory) 310, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 310 into memory 306) for execution by the system 400. The applications or other software intended for use on computer system 300 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 400 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 304) of computer system 300. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 300.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 300 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

APPENDIX

```
WITH
  "TIME#STAR$" as
    (select
        "TIME_DIM"."MONTH_ID" "TIME#MONTH_ID",
        "TIME_DIM"."CALENDAR_QUARTER_ID"
  "TIME#CALENDAR_QUARTER_ID",
        "TIME_DIM"."CALENDAR_YEAR_ID" "TIME#CALENDAR_YEAR_ID",
        "TIME_DIM"."FISCAL_QUARTER_ID" "TIME#FISCAL_QUARTER_ID",
        "TIME_DIM"."FISCAL_YEAR_ID" "TIME#FISCAL_YEAR_ID",
        "TIME_DIM"."CALENDAR_QUARTER_TIMESPAN"
  "TIME#CALENDAR_QUARTER_TIMESPAN",
        "TIME_DIM"."CALENDAR_QUARTER_END_DATE"
  "TIME#CALENDAR_QUARTER_END_DATE",
        "TIME_DIM"."CALENDAR_QUARTER_DSC"
  "TIME#CALENDAR_QUARTER_DSC",
        "TIME_DIM"."CALENDAR_YEAR_TIMESPAN"
  "TIME#CALENDAR_YEAR_TIMESPAN",
        "TIME_DIM"."CALENDAR_YEAR_END_DATE"
  "TIME#CALENDAR_YEAR_END_DATE",
        "TIME_DIM"."CALENDAR_YEAR_DSC" "TIME#CALENDAR_YEAR_DSC",
        "TIME_DIM"."FISCAL_QUARTER_TIMESPAN"
  "TIME#FISCAL_QUARTER_TIMESPAN",
        "TIME_DIM"."FISCAL_QUARTER_END_DATE"
  "TIME#FISCAL_QUARTER_END_DATE",
        "TIME_DIM"."FISCAL_QUARTER_DSC" "TIME#FISCAL_QUARTER_DSC",
        "TIME_DIM"."FISCAL_YEAR_TIMESPAN"
  "TIME#FISCAL_YEAR_TIMESPAN",
        "TIME_DIM"."FISCAL_YEAR_END_DATE"
  "TIME#FISCAL_YEAR_END_DATE",
        "TIME_DIM"."FISCAL_YEAR_DSC" "TIME#FISCAL_YEAR_DSC",
        "TIME_DIM"."CALENDAR_QUARTER_DSC_FRENCH"
  "TIME#CALENDAR_QUARTER_DSC_FRENCH",
        "TIME_DIM"."CALENDAR_QUARTER_DSC_DUTCH"
  "TIME#CALENDAR_QUARTER_DSC_DUTCH",
```

APPENDIX-continued

```
      "TIME_DIM"."CALENDAR_YEAR_DSC_FRENCH"
"TIME#CALENDAR_YEAR_DSC_FRENCH",
      "TIME_DIM"."CALENDAR_YEAR_DSC_DUTCH"
"TIME#CALENDAR_YEAR_DSC_DUTCH",
      "TIME_DIM"."FISCAL_QUARTER_DSC_FRENCH"
"TIME#FISCAL_QUARTER_DSC_FRENCH",
      "TIME_DIM"."FISCAL_QUARTER_DSC_DUTCH"
"TIME#FISCAL_QUARTER_DSC_DUTCH",
      "TIME_DIM"."FISCAL_YEAR_DSC_FRENCH"
"TIME#FISCAL_YEAR_DSC_FRENCH",
      "TIME_DIM"."FISCAL_YEAR_DSC_DUTCH"
"TIME#FISCAL_YEAR_DSC_DUTCH"
    from
      "GLOBAL"."TIME_DIM"
  ),
  SNG_PAR_DATA$ as
    (select /*+ vector_transform */
      H0."TIME#CALENDAR_QUARTER_ID"
"TIME#CALENDAR#CALENDAR_QUARTER_ID",
      sum(F."SALES") "MEASURES#SALES"
    from
      "TIME#STAR$" H0,
      "GLOBAL"."UNITS_FACT" F
    where
      (F."TIME_ID" = H0."TIME#MONTH_ID"
      and
      'QUARTER' = 'QUARTER')
    group by
      cast(2 as number(10)),
      H0."TIME#CALENDAR_YEAR_ID",
      H0."TIME#CALENDAR_QUARTER_ID"
  ),
  "TIME#CALENDAR#QUARTER#BASE$" as
    (select
      cast(2 as number(10)) "TIME#CALENDAR#DEPTH$",
      S."TIME#CALENDAR_QUARTER_ID"
"TIME#CALENDAR#CALENDAR_QUARTER_ID",
      S."TIME#CALENDAR_QUARTER_DSC"
"TIME#CALENDAR#CALENDAR_QUARTER_DSC"
    from
      "TIME#STAR$" S
    group by
      S."TIME#CALENDAR_YEAR_ID",
      S."TIME#CALENDAR_YEAR_TIMESPAN",
      S."TIME#CALENDAR_YEAR_END_DATE",
      S."TIME#CALENDAR_YEAR_DSC",
      S."TIME#CALENDAR_YEAR_DSC_FRENCH",
      S."TIME#CALENDAR_YEAR_DSC_DUTCH",
      S."TIME#CALENDAR_QUARTER_ID",
      S."TIME#FISCAL_QUARTER_ID",
      S."TIME#FISCAL_YEAR_ID",
      S."TIME#CALENDAR_QUARTER_TIMESPAN",
      S."TIME#CALENDAR_QUARTER_END_DATE",
      S."TIME#CALENDAR_QUARTER_DSC",
      S."TIME#FISCAL_QUARTER_TIMESPAN",
      S."TIME#FISCAL_QUARTER_END_DATE",
      S."TIME#FISCAL_QUARTER_DSC",
      S."TIME#FISCAL_YEAR_TIMESPAN",
      S."TIME#FISCAL_YEAR_END_DATE",
      S."TIME#FISCAL_YEAR_DSC",
      S."TIME#CALENDAR_QUARTER_DSC_FRENCH",
      S."TIME#CALENDAR_QUARTER_DSC_DUTCH",
      S."TIME#FISCAL_QUARTER_DSC_FRENCH",
      S."TIME#FISCAL_QUARTER_DSC_DUTCH",
      S."TIME#FISCAL_YEAR_DSC_FRENCH",
      S."TIME#FISCAL_YEAR_DSC_DUTCH"
  )
select /*+ no_merge
    opt_param('optimizer_capture_sql_plan_baselines','false')
    opt_param('optimizer_use_sql_plan_baselines','false')
    opt_estimate(table H0 rows=32) */
  H0."TIME#CALENDAR#CALENDAR_QUARTER_DSC",
  case H0."TIME#CALENDAR#DEPTH$"
    when 0
      then 'ALL'
    when 1
      then 'YEAR'
    when 2
      then 'QUARTER'
```

APPENDIX-continued

```
        when 3
           then 'MONTH'
        else cast(null as varchar2(1))
        end "TIME#CALENDAR#LEVEL_NAME",
   BD."MEASURES#SALES"
from
   SNG_PAR_DATA$ BD,
   "TIME#CALENDAR#QUARTER#BASE$" H0
where
   (1 = 1
   and
   (cast(2 as number(10)) = H0."TIME#CALENDAR#DEPTH$"
   and
   sys_op_map_nonnull(BD."TIME#CALENDAR#CALENDAR_QUARTER_ID") =
sys_op_map_nonnull(H0."TIME#CALENDAR#CALENDAR_QUARTER_ID")))
;
```

What is claimed is:

1. A method comprising:

storing query log data comprising a plurality of entries, each entry (1) corresponding to a query in a plurality of queries that were executed against a database and (2) indicating a tuple comprising a set of hierarchy levels corresponding to a set of dimensions;

identifying a plurality of tuples indicated in the query log data;

for each tuple in the plurality of tuples:
identifying a set of entries, from the plurality of entries, that indicate said each tuple and associating the set of entries with said each tuple;
generating aggregated performance data for said each tuple based on performance data associated with a query corresponding to each entry in the set of entries that is associated with said each tuple;
wherein a particular tuple in the plurality of tuples is associated with multiple entries from the plurality of entries;
wherein particular aggregated performance data for the particular tuple is based on (i) first performance data associated with a first query in the multiple entries and (ii) second performance data associated with a second query in the multiple queries;
based on the aggregated performance data, determining at least one of:
whether to create a first auto-cache table associated with said each tuple, or
whether to delete a second auto-cache table associated with said each tuple;
wherein an auto-cache table is created by aggregating data from one or more underlying fact tables used by a view for which the auto-cache table is created;

wherein the method is performed by one or more computing devices.

2. The method of claim 1, further comprising:
generating a ranking of the plurality of tuples based on the aggregated performance data;
wherein said determining is performed based on the ranking.

3. The method of claim 1, further comprising:
determining a number of queries that are associated with a certain tuple of the plurality of tuples;
based at least on the aggregated performance data for the certain tuple and the number of queries, determining whether to create an auto-cache table for the certain tuple.

4. The method of claim 1, wherein:
a certain tuple of the plurality of tuples is associated with a particular auto-cache table;
the aggregated performance data for the certain tuple indicates a number of queries associated with the certain tuple;
the method further comprising:
performing a comparison between the number of queries and a particular threshold number;
based on the comparison, determining whether to delete the particular auto-cache table.

5. The method of claim 1, further comprising:
for each tuple of the plurality of tuples:
determining whether an auto-cache table for said each tuple exists;
if an auto-cache table exists for said each tuple, then:
determining a difference between (i) a current aggregated performance associated with the auto-cache table and (ii) a previous aggregated performance associated with said each tuple, and
based on the difference, determining whether to delete the auto-cache table.

6. The method of claim 1, further comprising:
for each tuple of the plurality of tuples:
determining whether an auto-cache table for said each tuple exists;
if an auto-cache table does not exist for said each tuple, then determining whether there exists an auto-cache table associated with a tuple that supersedes said each tuple;
generating an auto-cache table for said each tuple if there does not exist an auto-cache table associated with a tuple that supersedes said each tuple.

7. The method of claim 6, wherein determining whether the first tuple associated with the existing auto-cache table supersedes said each tuple comprises, for each dimension indicated in the first tuple:
determining whether a first hierarchy level, for said each dimension, in the first tuple is at or below a second hierarchy level, for said each dimension, in said each tuple;
in response to determining that the first hierarchy level, for said each dimension, in the first tuple is at or below the second hierarchy level, for said each dimension, in said each tuple, determining not to generate the auto-cache table for said each tuple.

8. The method of claim 7, further comprising:
determining whether a particular hierarchy level, for a particular dimension, indicated in the first tuple is more than a threshold number of levels away from a certain hierarchy level, for said each dimension, indicated in said each tuple;

in response to determining that the particular hierarchy level, for the particular dimension, indicated in the first tuple is more than the threshold number of levels away from the certain hierarchy level, for said each dimension, indicated in said each tuple, determining that the first tuple does not supersede said each tuple.

9. The method of claim 1, further comprising, for a certain tuple of the plurality of tuples:

storing a plurality of system parameters comprising one or more of:
a first current total size of all auto-cache tables associated with multiple views;
a second current total size of all auto-cache tables for a particular view associated with the certain tuple;
a size of the auto-cache table for the certain tuple; or
a current number of auto-cache tables;

determining whether creating an auto-cache table for the certain tuple would cause any of the plurality of system parameters to exceed a corresponding threshold of a plurality of thresholds;

in response to determining that at least one system parameter of the plurality of system parameters exceeds a corresponding threshold of the plurality of thresholds, determining not to create an auto-cache table for the certain tuple or determining to discard another auto-cache table.

10. The method of claim 1, wherein a first tuple of the plurality of tuples indicates a first number of hierarchy levels and a second tuple of the plurality of tuples indicates a second number of hierarchy levels that is different than the first number of hierarchy levels.

11. One or more non-transitory storage media storing instructions which, when executed by one or more computing devices, cause:

storing query log data comprising a plurality of entries, each entry (1) corresponding to a query in a plurality of queries that were executed against a database and (2) indicating a tuple comprising a set of hierarchy levels corresponding to a set of dimensions;

identifying a plurality of tuples indicated in the query log data;

for each tuple in the plurality of tuples:
identifying a set of entries, of the plurality of entries, that indicate said each tuple and associating the set of entries with said each tuple;
generating aggregated performance data for said each tuple based on performance data associated with a query corresponding to each entry in the set of entries that is associated with said each tuple;
based on the aggregated performance data, determining at least one of:
whether to create an auto-cache table associated with said each tuple, or
whether to delete an auto-cache table associated with said each tuple;

wherein a particular tuple in the plurality of tuples is associated with multiple entries from the plurality of entries;

wherein particular aggregated performance data for the particular tuple is based on (i) first performance data associated with a first query in the multiple entries and (ii) second performance data associated with a second query in the multiple queries.

12. The one or more storage media of claim 11, wherein the instructions, when executed by the one or more processors, further cause:
generating a ranking of the plurality of tuples based on the aggregated performance data;
wherein said determining is performed based on the ranking.

13. The one or more storage media of claim 11, wherein the instructions, when executed by the one or more processors, further cause:
determining a number of queries that are associated with a certain tuple of the plurality of tuples;
based at least on the aggregated performance data for the certain tuple and the number of queries, determining whether to create an auto-cache table for the certain tuple.

14. The one or more storage media of claim 11, wherein:
a certain tuple of the plurality of tuples is associated with a particular auto-cache table;
the aggregated performance data for the certain tuple indicates a number of queries associated with the certain tuple;
the instructions, when executed by the one or more processors, further cause:
performing a comparison between the number of queries and a particular threshold number;
based on the comparison, determining whether to delete the particular auto-cache table.

15. The one or more storage media of claim 11, wherein the instructions, when executed by the one or more processors, further cause:
for each tuple of the plurality of tuples:
determining whether an auto-cache table for said each tuple exists;
if an auto-cache table exists for said each tuple, then:
determining a difference between (i) a current aggregated performance associated with the auto-cache table and (ii) a previous aggregated performance associated with said each tuple, and
based on the difference, determining whether to delete the auto-cache table.

16. The one or more storage media of claim 11, wherein the instructions, when executed by the one or more processors, further cause:
for each tuple of the plurality of tuples:
determining whether an auto-cache table for said each tuple exists;
if an auto-cache table does not exist for said each tuple, then determining whether there exists an auto-cache table associated with a tuple that supersedes said each tuple;
generating an auto-cache table for said each tuple if there does not exist an auto-cache table associated with a tuple that supersedes said each tuple.

17. The one or more storage media of claim 16, wherein determining whether the first tuple associated with the existing auto-cache table supersedes said each tuple comprises, for each dimension indicated in the first tuple:
determining whether a first hierarchy level, for said each dimension, in the first tuple is at or below a second hierarchy level, for said each dimension, in said each tuple;
in response to determining that the first hierarchy level, for said each dimension, in the first tuple is at or below the second hierarchy level, for said each dimension, in said each tuple, determining not to generate the auto-cache table for said each tuple.

18. The one or more storage media of claim 17, wherein the instructions, when executed by the one or more processors, further cause:
  determining whether a particular hierarchy level, for a particular dimension, indicated in the first tuple is more than a threshold number of levels away from a certain hierarchy level, for said each dimension, indicated in said each tuple;
  in response to determining that the particular hierarchy level, for the particular dimension, indicated in the first tuple is more than the threshold number of levels away from the certain hierarchy level, for said each dimension, indicated in said each tuple, determining that the first tuple does not supersede said each tuple.

19. The one or more storage media of claim 11, wherein the instructions, when executed by the one or more processors, further cause, for a certain tuple of the plurality of tuples:
  storing a plurality of system parameters comprising one or more of:
    a first current total size of all auto-cache tables associated with multiple views;
    a second current total size of all auto-cache tables for a particular view associated with the certain tuple;
    a size of the auto-cache table for the certain tuple; or
    a current number of auto-cache tables;
  determining whether creating an auto-cache table for the certain tuple would cause any of the plurality of system parameters to exceed a corresponding threshold of a plurality of thresholds;
  in response to determining that at least one system parameter of the plurality of system parameters exceeds a corresponding threshold of the plurality of thresholds, determining not to create an auto-cache table for the certain tuple or determining to discard another auto-cache table.

20. The one or more storage media of claim 11, wherein a first tuple of the plurality of tuples indicates a first number of hierarchy levels and a second tuple of the plurality of tuples indicates a second number of hierarchy levels that is different than the first number of hierarchy levels.

* * * * *